(12) United States Patent
Riess

(10) Patent No.: US 8,876,959 B2
(45) Date of Patent: Nov. 4, 2014

(54) SELF-HEATED DENSE CERAMIC TUBES FOR SEPARATING GASES

(75) Inventor: Ilan Riess, Moshav Beit-Shearim (IL)

(73) Assignee: Technion Research and Development Ltd, Technion, Haifa (IL)

( * ) Notice: Subject to any disclaimer, the term of this patent is extended or adjusted under 35 U.S.C. 154(b) by 711 days.

(21) Appl. No.: 12/745,894

(22) PCT Filed: Dec. 4, 2008

(86) PCT No.: PCT/IL2008/001581
§ 371 (c)(1),
(2), (4) Date: Oct. 17, 2010

(87) PCT Pub. No.: WO2009/072127
PCT Pub. Date: Jun. 11, 2009

(65) Prior Publication Data
US 2011/0041694 A1  Feb. 24, 2011

Related U.S. Application Data

(60) Provisional application No. 60/992,893, filed on Dec. 6, 2007.

(51) Int. Cl.
*B01D 53/22* (2006.01)
*B01D 59/16* (2006.01)
(Continued)

(52) U.S. Cl.
CPC ............ *B01D 39/2068* (2013.01); *B01D 53/22* (2013.01); *B01D 71/024* (2013.01); *H01M 2008/1293* (2013.01); *B01D 2313/34* (2013.01); *Y02E 60/525* (2013.01); *B01D 2313/22* (2013.01); *B01D 69/04* (2013.01)

USPC ................... 96/221; 55/522; 55/523; 55/524; 422/177; 422/178; 422/179; 422/180; 422/181; 144/169; 144/170; 144/171; 144/172; 144/182

(58) Field of Classification Search
USPC ............ 55/522–524; 422/177–182, 169–172; 96/221
See application file for complete search history.

(56) References Cited

U.S. PATENT DOCUMENTS 4,197,094 A  4/1980  Eisenkraft
5,004,485 A  4/1991  Hamlin et al.
(Continued)

OTHER PUBLICATIONS http://www.nernst.de/lamp/ipo18990227.htm.

*Primary Examiner* — Amber Orlando
(74) *Attorney, Agent, or Firm* — Edward Langer, Adv. and Patent Attorney

(57) ABSTRACT

A device for at least one self-heated and dense ceramic tube for gas separation. The device includes at least one dense ceramic tube in an environment accessible to a mixture of gases, the at least one tube acting as a diffusion membrane for separating at least one gas from the mixture of gases. Two electrical contacts are provided which allow connecting a power supply to the ceramic tube and driving an electric current through the ceramic tube. The contacts can be in the farm of short coils wrapped around the ceramic tube at difference places. When a voltage is applied to the contacts, an electrical current flows from one contact to the other through the ceramic tube. The current in the ceramic tube heats the tube. Thus, the tubes heat themselves. The hot tube allows separating a gas from the mixture of gases. The driving force for the diffusion is achieved by a pressure difference generated by pumping at the side of the separated gas and pressing at the side of the mixture of gases.

16 Claims, 3 Drawing Sheets

(51) Int. Cl.
*B01D 50/00* (2006.01)
*B01D 39/06* (2006.01)
*B01D 39/20* (2006.01)
*B01D 39/14* (2006.01)
*B01D 24/00* (2006.01)
*B01D 71/02* (2006.01)
*B01D 69/04* (2006.01)
*H01M 8/12* (2006.01)

(56) References Cited

U.S. PATENT DOCUMENTS

| | | |
|---|---|---|
| 5,723,074 A | 3/1998 | Balachandran et al. |
| 5,922,178 A | 7/1999 | Isenberg |
| 6,090,172 A * | 7/2000 | Dementhon et al. ......... 55/282.3 |
| 2003/0015431 A1 | 1/2003 | Barker |
| 2006/0191408 A1 | 8/2006 | Gopolan |

* cited by examiner

SELF-HEATED DENSE CERAMIC TUBES FOR SEPARATING GASES

CROSS REFERENCE TO RELATED APPLICATION

The present Application is based on International Application No. PCT/IL2008/01581 filed on Dec. 4, 2008, which is based on U.S. Provisional Application No. 60/992,893 filed on Dec. 6, 2007.

FIELD OF THE INVENTION

The present invention relates generally to separating a gas from a gas mixture, and more particularly to a device for applying self-heated dense ceramic tubes to the separation of a constituent gas from a gaseous mixture.

BACKGROUND OF THE INVENTION

Dense ceramic tubes are used in solid oxide fuel cells and as gas separation membranes, in particular for oxygen separation from air. Other uses are in water electrolysis and sensors. The ceramic material can be a solid electrolyte (SE), which conducts ions and has a negligible electron/hole conductivity. An example is YSZ ($Y_2O_3|_x$ stabilized $ZrO_2|_{1-x}$, $x \sim 0.1$), which conducts oxygen ions. SE's also serve in electrolyzers and in sensors that measure characteristic cell voltage. They also serve as gas separation membranes with ions of the filtered gas driven through them by an applied voltage. Dense tubes made of mixed ionic electronic ceramic (MIEC) conductors serve in gas separation membranes. The gas is driven through them by creating a pressure difference of the filtered substance, e.g. oxygen. In all these cases the selectivity is achieved by the nature of the ceramic material used. Thus, for the filtration of oxygen, certain oxides are used that allow only oxygen to diffuse through them in the form of ions accompanied by electrons/holes.

In all cases the ceramic has high resistance to ionic current at room temperature and the operating temperature is raised, usually to the range of 500 to 1100° C. The MIEC conductors may exhibit electronic (electron/hole) conduction at room temperatures.

Ceramic materials are known in the art as heating elements (e.g. SiC) and are also used as light sources in the form of Nernst glow lamps. In these cases an electrical current flows through the ceramic material. Nernst lamps were an early form of electrically powered incandescent lamps. Nernst lamps did not use a glowing tungsten filament. Instead, they used a ceramic rod that was heated to incandescence. The rod was an ionic conductor. In these cases a ceramic rod or strip, including a spiral strip was used. Unlike tungsten wire, the rod would not further oxidize when exposed to air. Therefore was no need to enclose it within a vacuum or noble gas environment. The burners in Nernst lamps could operate exposed to the air and were only enclosed in glass to isolate the hot incandescent emitter from its environment.

Developed by the German physicist and chemist Walther Nernst in 1897 at Goettingen University, these lamps were about twice as efficient as carbon filament lamps and they emitted a more "natural" light, more similar in spectrum to daylight. The lamps were quite successfully marketed for a time, although they eventually lost out to the more-efficient tungsten filament incandescent light bulb. One disadvantage of the Nernst design was that the ceramic rod was not electrically conductive at room temperature, so the lamps needed a separate heater filament to heat the ceramic hot enough to begin conducting electricity on its own. In the U.S., Nernst sold the patent to George Westinghouse who founded the Nernst Lamp Company at Pittsburgh in 1901.

Ceramic conductors such as SiC are used in furnaces for high temperature heating elements. They usually have a form of a spiral, and are used for operating the furnace in the temperature range 1000-1500° C. These exhibit electronic conductivity all the way down to room temperature. Purposeful ceramics tubes, such as for oxygen permeation, were not self-heated, but relied on external heating. The term self-heating means passing an electrical current through the ceramic tube which leads to heating of the tube.

A self-heated, dense ceramic tube for gas separation is disclosed. At least one dense ceramic tube is provided in an environment accessible to a mixture of gases, wherein the tube acting as a diffusion membrane for separating one gas from the mixture of gases. Two electrical contacts are provided which allow connecting a power supply to the ceramic tube and driving an electric current through the ceramic tube. The contacts can be in the form of short coils wrapped around the ceramic tube at difference places. They can have also other forms as mentioned below. When a voltage is applied to the contacts, an electrical current flows from one contact to the other through the ceramic tube. The current in the ceramic tube heats the tube. (The contacts need not contribute to heating). Thus, the tubes heat themselves. The hot tube allow separating one gas from the mixture of gases. The driving force for the diffusion is achieved by a pressure difference of the filtered substance generated by pumping at the side of the separated gas and/or pressing at the side of the mixture of gases.

Thus, it would be advantageous to enable significant electronic conductivity in dense ceramic tubes by self-heating to elevated temperatures to enable gas separation.

SUMMARY OF THE INVENTION

Accordingly, it is a principal object of the present invention to provide ceramic, self-heated and dense tubes for handling gases.

It is another principal object of the present invention to provide dense self-heated ceramic tubes for use as gas separation membranes.

It is still another principal object of the present invention to provide multiple ceramic tubes in a single cell connected in parallel or in series to the power supply and to the output gas collecting mechanism.

It is one other principal object of the present invention to reach elevated temperatures by eliminating the need for placing the ceramic tubes in a furnace and rely solely on self-heating.

It is one more principal object of the present invention to provide ceramic tubes for gas separation being self heated, having either both sides open or one side open.

It is yet another principal object of the present invention to dispense with the use of a furnace when the ceramic material has sufficient electrical conductance throughout the whole temperature range.

It is one other principal object of the present invention to dispense with the use of a furnace when the ceramic material exhibits a low, but sufficient electrical conductivity, even at room temperature.

Exemplary material for use with the present invention is $Ba_{0.5}Sr_{0.5}Co_{0.8}Fe_{0.2}O_{3-x}$.

When the room temperature resistance is high, then an auxiliary furnace is helpful in order to heat the cell to a starting temperature which is higher than room temperature.

Further heating above the starting temperature is achieved by a current flowing through the ceramic tube, i.e. by self heating. Once self heating sets in, the auxiliary furnace can be switched off.

There has thus been outlined, rather broadly, the more important features of the invention in order that the detailed description thereof that follows hereinafter may be better understood. Additional details and advantages of the invention will be set forth in the detailed description, and in part will be appreciated from the description, or may be learned by practice of the invention.

BRIEF DESCRIPTION OF THE DRAWINGS

In order to understand the invention and to see how it may be carried out in practice, a preferred embodiment will now be described, by way of a non-limiting example only, with reference to the accompanying drawings, in which.

DETAILED DESCRIPTION OF AN EXEMPLARY EMBODIMENT

The principles and operation of a method and an apparatus according to the present invention may be better understood with reference to the drawings and the accompanying description, it being understood that these drawings are given for illustrative purposes only and are not meant to be limiting.

As an application example, reference is now made to gas separation membranes, specifically as applied to oxygen separation from air.

Figure 1:
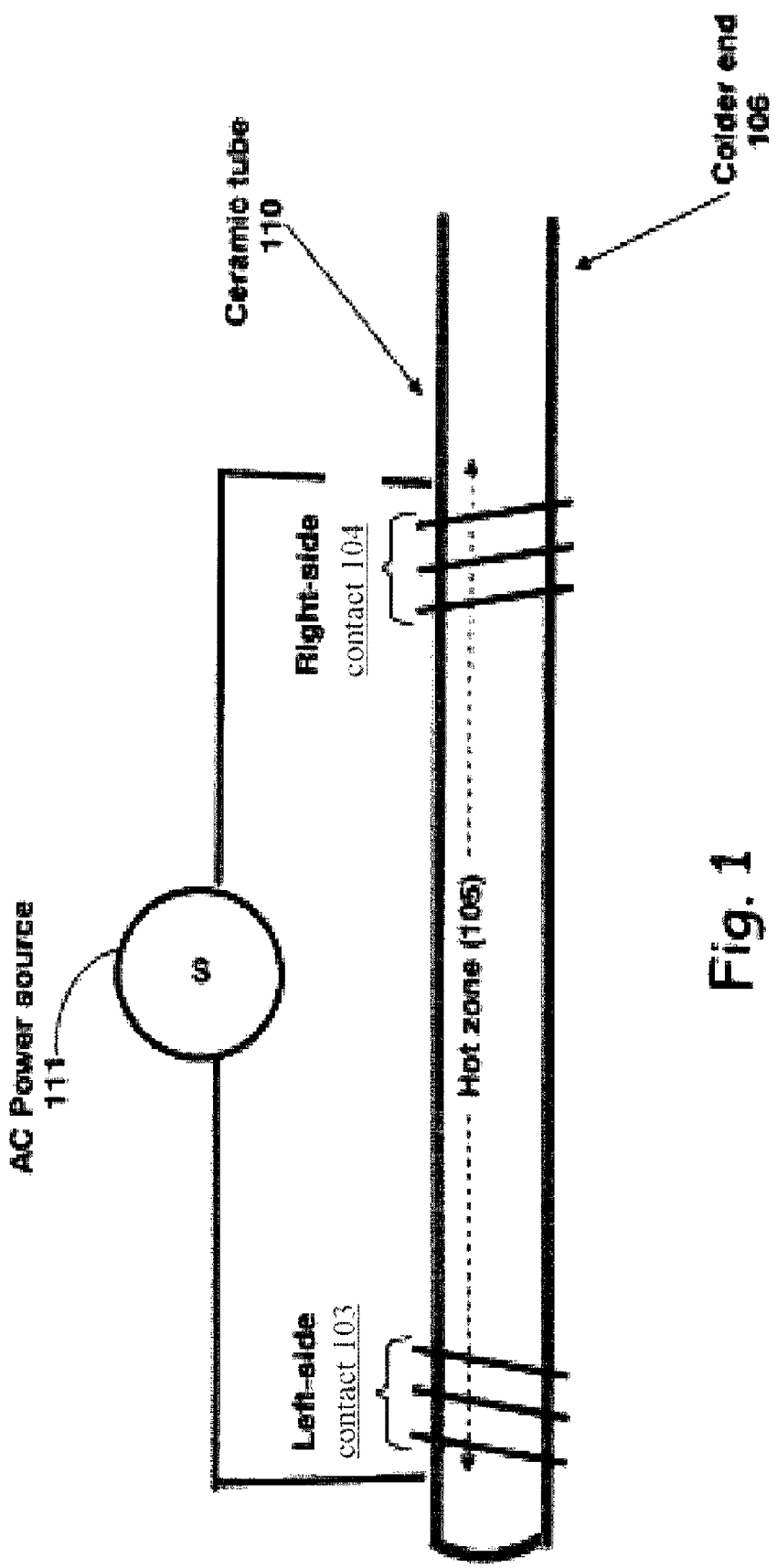
FIG. 1 is a schematic illustration of the self-heating of a ceramic tube by connecting it to a power supply and driving an electric current through the ceramic tube from one contact (in the form of a short coil) to a second contact (in the form of a short coil), constructed according to the principles of the present invention.

FIG. 1 is a schematic illustration of the self-heating of a ceramic tube by connecting it to a power supply and driving an electric current through the tube from one contact (in the form of a short coil to a second contact (in the form of a short coil). It should be noted that the supply gas, which can be air or oxygen enriched air, and pure oxygen sides of the membrane are interchangeable. However, the example refers to the pure oxygen being in the inner portion of the tube. The driving force for the diffusion is achieved by a pressure difference in the filtered substance generated by either pumping at the oxygen side, pressing at the supply gas side or a combination of both. AC power supply 111 for heating tube 110 is preferable, because a DC current may cause rapid aging of the tube due to stoichiometric changes and may even generate electrolysis as a result of the motion of ions in one direction under the DC force. Thus, the ac source is preferred in order to eliminate the danger of deterioration of the tube under long dc current. An electrical contact to the tube is indicated as a left-side coil 103 and a second contact 104 as the right-side coil wound around tube 110. The electrical contact can also be achieved, e.g., by using a clip or by pressing a contact onto tube 110. Contact 103 is applied to one (closed) end of tube 110, while contact 104 is spaced from the other end, thereby resulting in a hot zone 105 between the contacts and an unheated colder end 106.

Figure 2A:
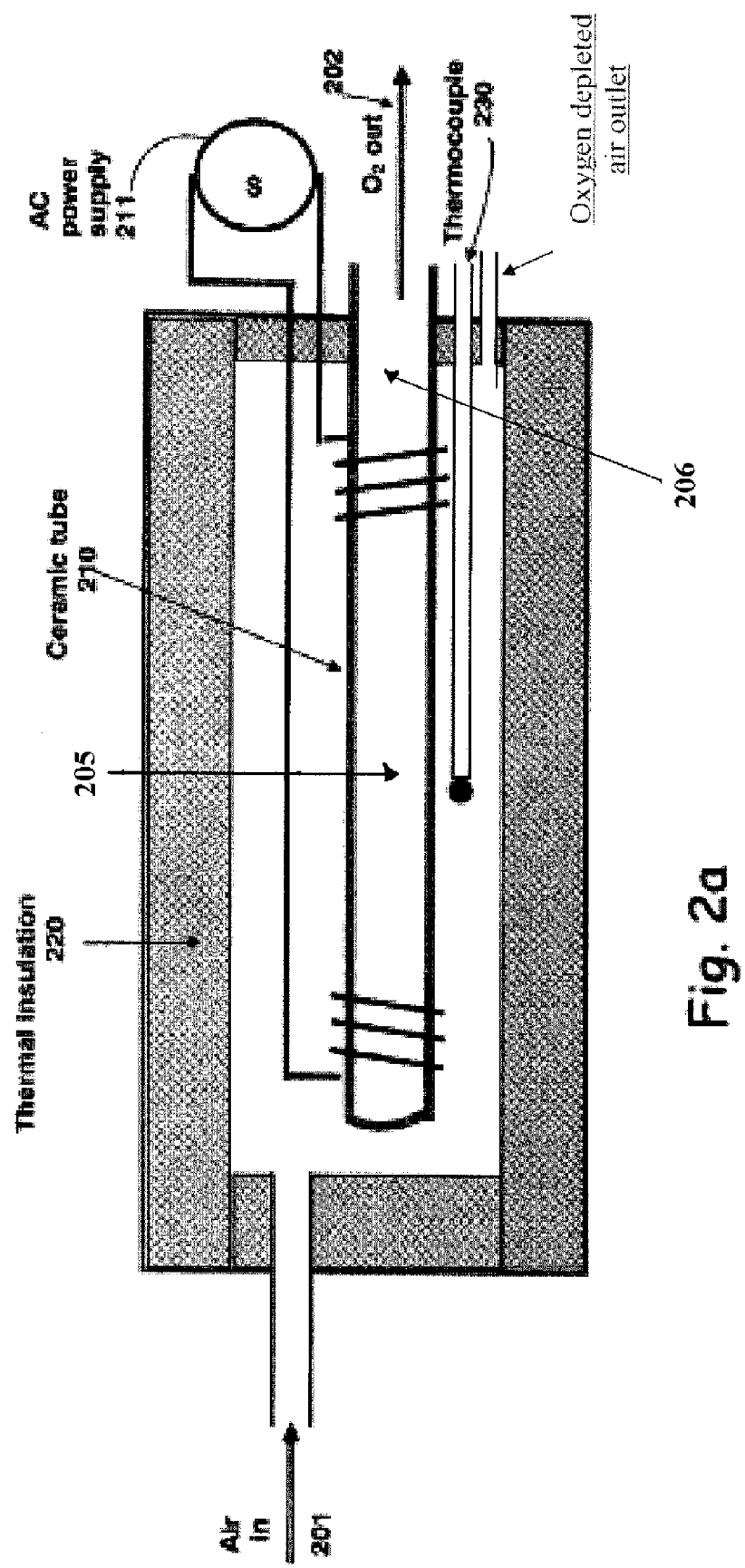
FIG. 2a is a schematic illustration of a whole gas separation cell, constructed according to the principles of the present invention.

FIG. 2a is a schematic illustration of a whole gas separation cell, constructed according to the principles of the present invention. In the exemplary embodiment of FIG. 2a, the whole gas being separated is oxygen 202 being separated from air 201. The colder end 206 of the ceramic tube 210 is not directly heated. There is some heat flow from the directly heated hot zone 205 towards colder end 206 which, however, stays colder and may require cooling. The connection of tube 210 to the cell housing is made at the colder end 206.

A controller (not shown) controls the AC power supply 211 used for heating, supplying an electrical current to the ceramic tube via the two contacts (in the form of short coils) as described with reference to FIG. 1 above. The temperature is monitored by a thermocouple 230. The contacts, tube 210 and thermocouple 230 are encased in a housing which contains also thermal insulation 220. FIG. 2a shows only one ceramic tube 210 for clarity. However, in a preferred embodiment, a bundle of ceramic tubes can be inserted in parallel into thermal insulation housing 220 and heated in the same manner.

The electrical connection to the bundle can be made either to each and every ceramic tube or only to some of the tubes, e.g. the outer ones, and then the current enters the others by contact. A combination of the two methods is also possible.

An exemplary ceramic tube is made of $Ba_{0.5}Sr_{0.5}Co_{0.3}Fe_{0.2}O_{3-x}$. For oxygen separation the tube is dense and gas tight. A typical resistance of ~5 kΩ at room temperature can be decreased by orders of magnitude on heating to 850° C. At this temperature oxygen filters through the tube. BSCFO exhibits, to date, the highest permeability of oxygen. The disadvantage of BSCFO is that it reacts, mainly with $CO_2$ below 850° C. and deteriorates.

Figure 2B:
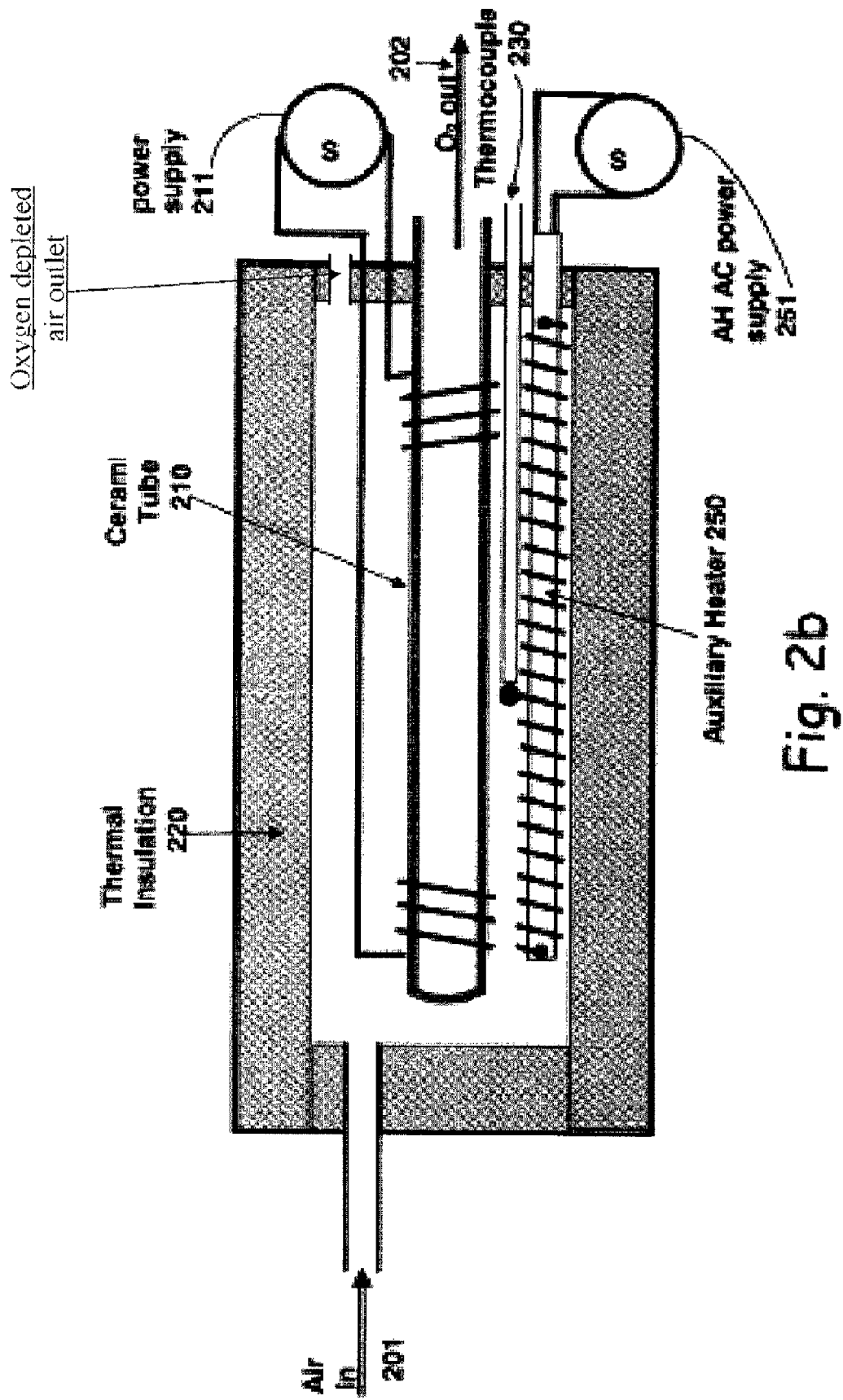
FIG. 2b is a schematic illustration of the whole gas separation cell of FIG. 2a with an auxiliary heater added, constructed according to the principles of the present invention.

FIG. 2b is a schematic illustration of the whole gas separation cell of FIG. 2a with an auxiliary heater (AH) 250 added, constructed according to the principles of the present invention. Auxiliary heater 250 powered by AH AC or dc power supply 251 allows the heating of a few designated tubes comprising a bundle of tubes to intermediate temperatures at which their resistance is lower than at room temperature. It is then easier to heat them further. For example auxiliary heater 250 can heat ceramic tube (CT) 210 to 17° C. After reaching 170° C. the applied voltage from CT AC power supply 211 with its contacts on tube 210 (in the form of short coils) takes over as the main heating means. Heating to ~850° C. is needed so that the ceramic is able to function. The fact that the supply gas (e.g. air) is also heated is a by product, not a goal.

With an appropriate controller (not shown), auxiliary heater 250 is not needed.

Advantages

The self-heating allows for a simpler construction, smaller thermal insulation 220, smaller volume of tube 210 and faster heating and cooling. Faster heating is a significant property that allows one to use sensitive materials such as BSCFO. It also provides a more convenient, more rapidly responding solution.

It is preferable to reduce energy losses. This is because the purpose of the heating is to raise the temperature of the ceramic tubes. In the device of the present invention the tubes heat themselves. Thus the air around them acts as an insulator. This is supplemented by a solid insulating layer so that the outer temperature of the device can be maintained at close to room temperature. In the common heating arrangement a furnace is introduced into the device with an inner diameter larger than that of the bundle of ceramic tubes. The heat generated by the furnace is transferred to the ceramic tubes through the gas that has to be hot and cannot serve as an insulator. Thus either the heat losses increase or the solid insulating layer has to be significantly thicker. Further, with self heating the ceramic tubes heat to the highest temperature only the gas in contact with the tube and extra gas not in contact with the tube may be at a somewhat lower temperature, reducing the average temperature of the gas and thereby also the thermal loss.

Having described the present invention with regard to certain specific embodiments thereof, it is to be understood that the description is not meant as a limitation, since further modifications will now suggest themselves to those skilled in the art, and it is intended to cover such modifications as fall within the scope of the appended claims.

I claim:

1. A self-heating ceramic tube for use in oxygen separation, comprising a first non-resistive electric contact disposed on and electrically connected to said ceramic tube and connected to an external power supply, and a second non-resistive electric contact disposed on and electrically connected to said ceramic tube at a distance from said first contact and connected to said external power supply, such that when power is supplied, a current flows between said first and second non-resistive contacts through said ceramic tube, thereby heating said ceramic tube, wherein a heated hest zone is defined along and in said ceramic tube between said contacts and a non-heated cold zone is defined between said second contact and one end of said ceramic tube, and wherein said first and second electric contacts are not connected to each other by a conductor other than said ceramic tube.

2. The ceramic tube according to claim 1, wherein said first electric contact being disposed near a closed end of said ceramic tube and said second contact being spaced a distance from an open end of said ceramic tube.

3. The ceramic tube according to claim 1, wherein said contacts are non-resistive coils wrapped around said ceramic tube.

4. The ceramic tube according to claim 1, wherein said ceramic tube being made of $Ba_{0.5}Sr_{0.5}Co_{0.8}Fe_{0.2}O_{3-x}$ (BSCFO).

5. The ceramic tube according to claim 1, wherein said ceramic tube being gas tight.

6. A gas separation cell comprising: a housing having an inlet for a gas mixture containing oxygen and an outlet for a gas mixture from which oxygen has been removed; and, a self-heating ceramic tube positioned within said housing, comprising a first non-resistive electric contact disposed on and electrically connected to said ceramic tube and connected to an external power supply, and a second non-resistive electric contact disposed on and electrically connected to said ceramic tube at a distance from said first contact and connected to said external power supply, wherein a heated hot zone is defined along and in said ceramic tube between said contacts and a non-heated cold zone is defined between said second contact and one end of said ceramic tube, and wherein oxygen exits from at least one of the ends of said ceramic tube.

7. The gas separation cell according to claim 6, further comprising a plurality of said self-heating ceramic tubes positioned within said housing, wherein a heated hot zone is defined along and in each said ceramic tube between said contacts and a non-heated cold zone is defined between said second contact and one end of each said ceramic tube and wherein oxygen exits from at least one of the ends of each said ceramic tube.

8. The gas separation cell according to claim 6, wherein said first electric contact being disposed near a closed end of said ceramic tube and said second contact being spaced a distance from an open end of said ceramic tube.

9. The gas separation cell according to claim 6, wherein said contacts are non-resistive coils wrapped around said ceramic tube.

10. The gas separation cell according to claim 6, wherein said ceramic tube being made of $Ba_{0.5}Sr_{0.5}Co_{0.8}Fe_{0.2}O_{3-x}$ (BSCFO).

11. The gas separation cell according to claim 6, wherein said ceramic tube being gas tight.

12. A gas separation cell according to claim 6, further comprising a thermocouple monitoring temperature within the housing.

13. A gas separation cell according to claim 6, wherein said housing containing thermal insulation around its exterior walls.

14. A gas separation cell according to claim 6, further comprising an auxiliary heater within said housing.

15. A gas separation cell according to claim 6, wherein said cold zone of said ceramic tube or tubes being connected to a wall of said housing.

16. A gas separation cell according to claim 12, further comprising an auxiliary heater within said housing.

* * * * *